United States Patent
Arra et al.

(10) Patent No.: US 10,673,801 B2
(45) Date of Patent: Jun. 2, 2020

(54) DYNAMIC COMMUNICATION SESSION MANAGEMENT

(71) Applicant: International Business Machines Corporation, Armonk, NY (US)

(72) Inventors: Venkat R. Arra, Bengaluru (IN); Ritesh K. Gupta, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 15/825,515

(22) Filed: Nov. 29, 2017

(65) Prior Publication Data
US 2019/0166081 A1 May 30, 2019

(51) Int. Cl.
| | | |
|---|---|---|
| *H04L 12/58* | (2006.01) | |
| *H04L 29/08* | (2006.01) | |
| *H04L 29/14* | (2006.01) | |
| *H04L 29/06* | (2006.01) | |

(52) U.S. Cl.
CPC .......... *H04L 51/30* (2013.01); *H04L 29/0619* (2013.01); *H04L 65/1059* (2013.01); *H04L 65/80* (2013.01); *H04L 67/141* (2013.01); *H04L 67/142* (2013.01); *H04L 67/145* (2013.01); *H04L 69/14* (2013.01); *H04L 69/40* (2013.01)

(58) Field of Classification Search
CPC ..... H04L 51/30; H04L 67/145; H04L 67/141; H04L 67/142; H04L 69/40; H04L 69/14; H04L 29/0619; H04L 65/1059; H04L 65/80
See application file for complete search history.

(56) References Cited

U.S. PATENT DOCUMENTS

| | | | | |
|---|---|---|---|---|
| 6,668,175 B1 * | 12/2003 | Almgren | ................. | H04L 47/14 455/522 |
| 6,735,634 B1 * | 5/2004 | Geagan | ..................... | H04L 1/22 375/E7.023 |
| 6,804,252 B1 * | 10/2004 | Johnson | ................ | H04L 1/1607 370/458 |
| 7,406,332 B1 * | 7/2008 | Gaillard | ................ | H04W 88/02 235/380 |
| 7,730,137 B1 * | 6/2010 | Toomey | ................... | H04L 51/12 709/206 |
| 8,176,154 B2 * | 5/2012 | Minhazuddin | .......... | H04L 29/06 709/223 |
| 8,223,711 B1 * | 7/2012 | Khanka | ............. | H04W 72/1226 370/329 |

(Continued)

FOREIGN PATENT DOCUMENTS

| | | | | | |
|---|---|---|---|---|---|
| JP | 10294729 A | * | 11/1998 | ............. | H04Q 11/04 |
| JP | 2001292468 A | * | 10/2001 | | |
| JP | 2005027314 A | * | 1/2005 | ........ | H04W 36/0011 |

*Primary Examiner* — Kostas J Katsikis
(74) *Attorney, Agent, or Firm* — Robert J. Shatto

(57) ABSTRACT

A computer detects initialization of a first messaging session. The computer receives one or more message commands relating to one or more messages. The computer monitors message progress of the first messaging session. The computer detects errors in the message progress. The computer starts one or more additional messaging session(s). The computer monitors message progress of the first messaging session and the one or more additional messaging session(s). The computer detects contraction of messaging sessions is appropriate. The computer closes one or more messaging sessions.

19 Claims, 4 Drawing Sheets

(56) References Cited

U.S. PATENT DOCUMENTS

| | | | | |
|---|---|---|---|---|
| 9,055,139 | B1* | 6/2015 | Devireddy | H04L 67/42 |
| 9,124,668 | B2* | 9/2015 | Giebler | H04L 67/2823 |
| 9,826,000 | B2* | 11/2017 | Kumar | H04L 61/10 |
| 9,838,464 | B2* | 12/2017 | Lacharme | H04L 67/08 |
| 9,881,070 | B2* | 1/2018 | Kumar | G06F 9/45533 |
| 10,298,627 | B2* | 5/2019 | Herrero | H04L 63/0272 |
| 10,334,055 | B2* | 6/2019 | Arra | H04L 67/142 |
| 2002/0120749 | A1* | 8/2002 | Widegren | H04L 12/14 709/227 |
| 2003/0120135 | A1* | 6/2003 | Gopinathan | A61B 5/411 600/300 |
| 2003/0177174 | A1* | 9/2003 | Allen | G06F 3/06 709/203 |
| 2004/0193714 | A1* | 9/2004 | Bowman | H04L 45/742 709/227 |
| 2005/0154940 | A1* | 7/2005 | Umeda | H04L 43/50 714/25 |
| 2006/0029037 | A1* | 2/2006 | Chen | H04L 29/06027 370/351 |
| 2006/0195529 | A1* | 8/2006 | Braun | H04L 51/28 709/206 |
| 2006/0195530 | A1* | 8/2006 | Braun | H04L 51/30 709/206 |
| 2006/0195531 | A1* | 8/2006 | Braun | G06Q 10/107 709/206 |
| 2008/0020775 | A1* | 1/2008 | Willars | H04L 47/10 455/445 |
| 2008/0062863 | A1* | 3/2008 | Ginde | H04L 12/66 370/221 |
| 2009/0181702 | A1* | 7/2009 | Vargas | H04L 51/14 455/466 |
| 2009/0248802 | A1* | 10/2009 | Mahajan | G06F 9/541 709/204 |
| 2009/0303897 | A1* | 12/2009 | Kouretas | H04L 41/5087 370/252 |
| 2010/0191858 | A1* | 7/2010 | Thomas | H04L 65/4076 709/231 |
| 2011/0066703 | A1* | 3/2011 | Kaplan | H04L 65/4084 709/219 |
| 2011/0224811 | A1* | 9/2011 | Lauwers | G06F 3/16 700/94 |
| 2011/0307614 | A1* | 12/2011 | Bernardi | G06F 9/452 709/227 |
| 2011/0317587 | A1* | 12/2011 | Lida | H04L 12/2832 370/254 |
| 2012/0054362 | A1* | 3/2012 | Tsao | H04L 12/66 709/232 |
| 2014/0025763 | A1* | 1/2014 | Furlong | H04L 51/12 709/206 |
| 2014/0040182 | A1* | 2/2014 | Gilder | G06Q 40/12 707/602 |
| 2014/0136403 | A1 | 5/2014 | Das et al. | |
| 2014/0280332 | A1* | 9/2014 | Porterfield | G06F 16/951 707/770 |
| 2014/0348044 | A1* | 11/2014 | Narayanan | H04L 65/1016 370/310 |
| 2015/0029938 | A1* | 1/2015 | Eller | H04L 65/4061 370/328 |
| 2015/0032857 | A1* | 1/2015 | Hamm | H04N 21/234327 709/219 |
| 2015/0134840 | A1* | 5/2015 | Thompson | H04N 5/76 709/228 |
| 2015/0180767 | A1* | 6/2015 | Tam | H04L 47/10 370/389 |
| 2016/0149836 | A1* | 5/2016 | Narayanan | H04L 67/42 709/206 |
| 2016/0285977 | A1* | 9/2016 | Ng | H04L 67/142 |
| 2016/0360466 | A1* | 12/2016 | Barak | H04W 8/26 |
| 2017/0041231 | A1* | 2/2017 | Seed | H04L 67/14 |
| 2017/0041398 | A1 | 2/2017 | Kumar et al. | |
| 2017/0359423 | A1* | 12/2017 | Nadathur | H04N 7/186 |
| 2018/0063764 | A1* | 3/2018 | Bollapalli | H04W 76/10 |
| 2018/0219953 | A1* | 8/2018 | Arra | H04L 67/142 |
| 2019/0166081 | A1* | 5/2019 | Arra | H04L 51/30 |

* cited by examiner

DYNAMIC COMMUNICATION SESSION MANAGEMENT

BACKGROUND

The present disclosure generally relates to communication sessions, and more specifically, to managing communication sessions. Many distributed applications today rely on TCP/IP (Transmission Control Protocol/Internet Protocol) as their primary method of communication between computer nodes. This often involves the use of a single socket session between nodes, which can provide sufficient bandwidth for some applications; however other applications, including streaming applications, require or could benefit from additional bandwidth.

SUMMARY

Disclosed herein are embodiments of a method, system, and computer program product for communications management. A computer detects initialization of a first messaging session. The computer receives one or more message commands relating to one or more messages. The computer monitors message progress of the first messaging session. The computer detects errors in the message progress. The computer starts one or more additional messaging session(s). The computer monitors message progress of the first messaging session and the one or more additional messaging session(s). The computer detects contraction of messaging sessions is appropriate. The computer closes one or more messaging sessions.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
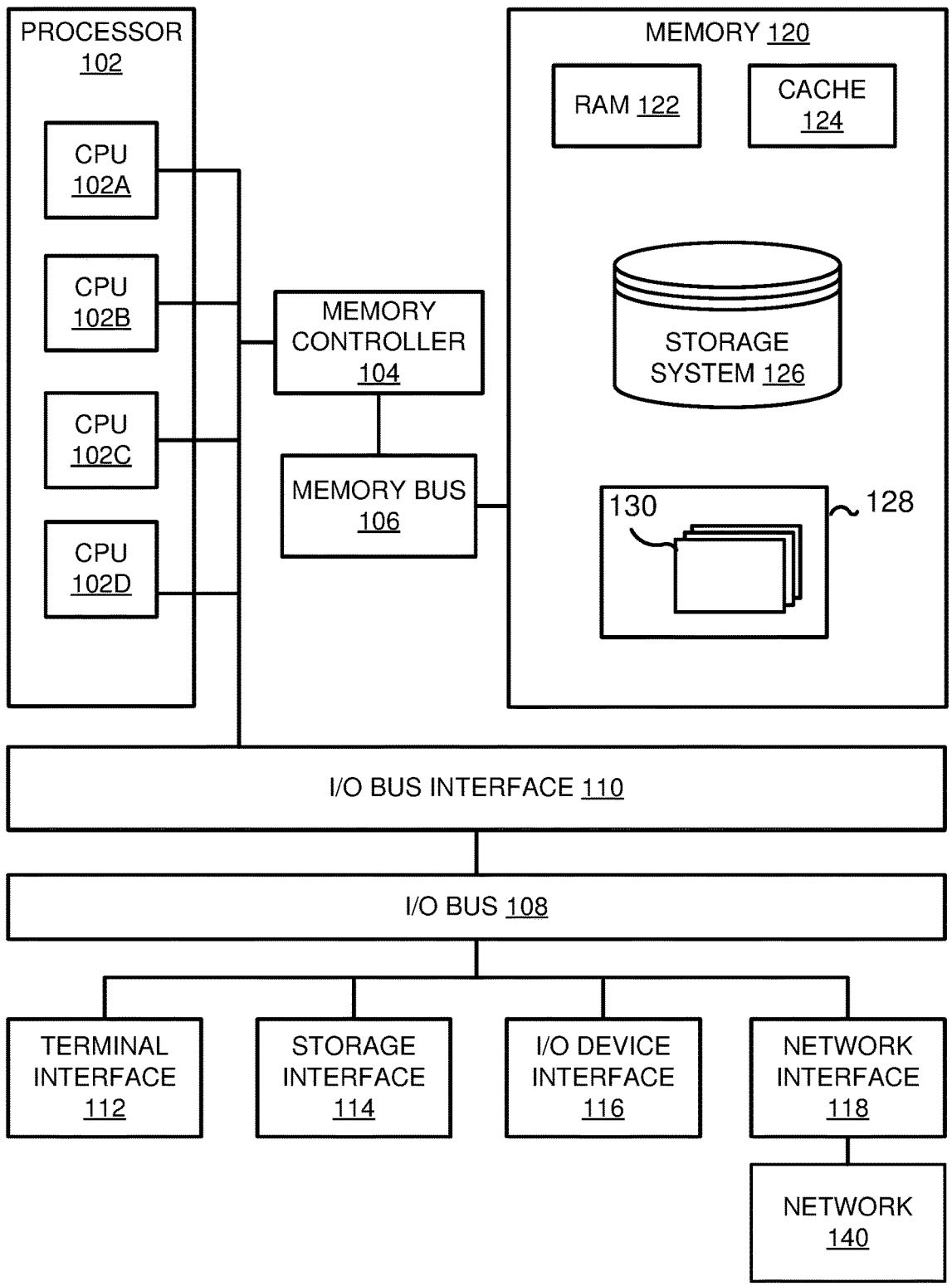
FIG. 1 depicts a high-level block diagram of an example computer system in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to communication sessions, and more specifically, to communication session management. While the present disclosure is not necessarily limited to such applications, various aspects of the disclosure can be appreciated through a discussion of various examples using this context.

While TCP/IP communication methods often use a single session, a multi-session approach can increase network bandwidth and end-to-end throughput up until the point that a single threaded target node's capability to offload the network traffic is not exceeded. Additionally, increasing the number of the target node's processing threads allows for a faster network off-load, so long as the target node's post-processing sink is scalable as well. However, increasing the number of sessions or sessions and threads can result in message ordering problems where the target node is receiving multiple messages simultaneously without proper ordering information. Additionally, use of multiple sessions should be scalable upwards and downwards such that additional sessions can be used when appropriate, and closed when no longer needed. Many applications are not designed in accordance with these principles, whether due to complexity or pressures to deliver the applications to market.

Aspera's FASP® (Fast and Secure Protocol) offers many benefits over TCP/IP communication methods. For example, FASP can operate at higher transport speeds and higher bandwidths than TCP/IP. Additionally, Aspera offers an API (application programming interface) through which programmers can utilize Aspera's FASP technology with their programs without need for programmers to develop complicated communication transfer mechanisms for their programs. This disclosure provides for a communications layer which can be added to an API or otherwise provided for use in programs to supplement and enhance communication session management. As used herein, a communications layer can refer to a component which can be utilized by or added to a program such as a plug-in, interface, or otherwise used by a program in facilitating communications, such as between two computers and/or two virtual machines. This communications layer can be accessed or implemented through the use of an API in some embodiments. An application designed for a single session can plug in and use such a communications layer to allow for and enable dynamic session management using multiple sessions that adjusts to current network conditions, which can be implemented by use of an API. This communications layer, under the context of a single, application-level, logical session, isolates out the complexities of session management, ordering, and grouping, and the network analysis needed to adjust the configuration based on current conditions. Through the use of API, various aspects of communication session management can be customizable with little effort involved on the part of individual programmers. In some embodiments, this disclosure can use Aspera API to push data to a target computer without writing the data onto local disk first. In many cases currently, data is written to disk before sending to targets. While Aspera's FASP and API are discussed here, this disclosure is not to be read as limited to use with Aspera's technology.

In many situations, communications may be desired to be sent using encryption to prevent unauthorized access to the communications. The communications layer discussed herein can provide for encryption at the level of the communications layer without requiring a programmer to manually provide for encryption in a program, but can instead implement the communications layer. Additionally, many communications can be sent more quickly and/or efficiently when using compression to decrease the size of files to be sent and received, which can increase the speed of communication and/or lower bandwidth requirements. The communications layer discussed herein can provide for such compression for applications which utilize the communications layer.

Embodiments of the present disclosure include communication session management using multiple sessions when appropriate. In accordance with embodiments disclosed herein, a communications layer can detect session initialization. The communications layer can receive one or more message commands, including send commands and receive commands. The communications layer can also process encryption and/or compression, including a communications layer of a sending computer encrypting and/or compressing messages and a communications layer of a receiving computer decrypting and/or decompressing messages. The communications layer can then process the messages, by sending or receiving them. The communications layer can monitor the progress of the messages, which can include monitoring for the end of messages and whether any error messages, such as "eagain" or "ewouldblock" errors, are detected. If such errors occur, or such errors in excess of a threshold occur, the communications layer can start an additional session and begin sending or receiving messages through the new session. When an additional session is started, the communications layer can communicate ordering information such that messages can be received over the multiple sessions in appropriate orders. Message monitoring can continue, including monitoring for the end of messages and whether any error messages, such as "eagain" or "ewouldblock" errors, are detected. If additional errors are detected, additional sessions can be started. If an additional session has been started, and additional errors are not received, the communications layer can determine whether to contract the number of sessions and if so, close one or more sessions.

FIG. 1 depicts a high-level block diagram of an example computer system 100 (e.g., a communications device) that can be used in implementing one or more of the methods (such as method 200 in accordance with FIG. 2, as described infra), tools, and modules, and any related functions, described herein, in accordance with embodiments of the present disclosure. In some embodiments, the components of the computer system 100 can comprise one or more processors 102, a memory subsystem 120, a terminal interface 112, a storage interface 114, an I/O (Input/Output) device interface 116, and a network interface 118, all of which can be communicatively coupled, directly or indirectly, for inter-component communication via a memory bus 106, an I/O bus 108, and an I/O bus interface unit 110.

The computer system 100 can contain one or more general-purpose programmable central processing units (CPUs) 102A, 102B, 102C, and 102D (four CPUs are shown by way of example and should not be read as limiting to or requiring four CPUs), herein generically referred to as processor 102 or CPU 102. Any or all of the CPUs of CPU 102 can contain multiple processing cores in various embodiments. In some embodiments, the computer system 100 can contain multiple processors typical of a relatively large system; however, in other embodiments the computer system 100 can alternatively be a single CPU system. Each CPU 102 can execute instructions stored in the memory subsystem 120 and can include one or more levels of on-board cache that provide temporary storage of instructions and data for the CPUs 102. The CPUs 102 can be comprised of one or more circuits configured to perform one or more methods consistent with embodiments of the present disclosure. The control of data flow from the processor 102 to the memory subsystem 120 can be facilitated by memory controller 104. The memory controller 104 can be configured to direct data to appropriate locations (e.g., addresses) within the memory subsystem 120.

Memory subsystem 120 (also referred to herein as "memory 120") can include computer system readable media in the form of volatile memory, such as random-access memory (RAM) 122 or cache memory 124. Computer system 100 can further include other removable/non-removable, volatile/non-volatile computer system storage media. By way of example only, storage system 126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 120 can include flash memory, e.g., a flash memory stick drive or a flash drive. In some embodiments, the storage system 126 can be replaced by storage area-network (SAN) devices, the cloud, or other devices connected to the computer system 100 via the I/O device interface 116 or a network 140 via the network interface 118. Memory devices can be connected to memory bus 106 by one or more data media interfaces. The memory subsystem 120 can include at least one program product having a set (e.g., at least one) of program modules that are configured to carry out the functions of various embodiments.

Further, one or more memory modules can be included in the storage system 126. For example, one or more DIMMs can be included in the storage system 126 in lieu of or in addition to RAM 122. The one or more memory modules can include their own memory controllers, processors, buses, and any other suitable memory module components.

It is noted that FIG. 1 is intended to depict representative components of an example computer system 100. In some embodiments, however, individual components can have greater or lesser complexity than as represented in FIG. 1, components other than or in addition to those shown in FIG. 1 can be present, and the number, type, and configuration of such components can vary.

One or more programs/utilities 128, each having at least one set of program modules 130 can be stored in memory 120. The programs/utilities 128 can include a hypervisor (also referred to as a virtual machine monitor), one or more operating systems, one or more application programs, other program modules, user interfaces, and program data. Each of the operating systems, one or more application programs, other program modules, and program data or some combination thereof, can include an implementation of a networking environment. In some embodiments, one or more programs/utilities 128, each having at least one set of program modules 130 can be used in implementing method 200 in accordance with FIG. 2, as described infra.

The computer system 100 can interface a variety of peripheral devices, storage devices, and networks (including network 140) through the terminal interface 112, storage interface 114, I/O device interface 116, and network interface 118. For example, I/O device interface 116 can receive input from a user and present information to a user and/or a device interacting with computer system 100.

Although the memory bus 106 is shown in FIG. 1 as a single bus structure providing a direct communication path among the CPUs 102, the memory subsystem 120, and the I/O bus interface 110, the memory bus 106 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 110 and the I/O bus 108 are shown as single respective units, the computer system 100 can, in some embodiments, contain multiple I/O bus interface units 110, multiple I/O buses 108, or both. Further, while multiple I/O interface units are shown, which separate the I/O bus 108 from various communications paths running to the various I/O devices, in other embodiments some or all of the I/O devices can be connected directly to one or more system I/O buses.

In some embodiments, the computer system 100 can be a multi-user mainframe computer system, a single-user system, or a server computer or similar device that has little or no direct user interface, but receives requests from other computer systems (clients). Further, in some embodiments, the computer system 100 can be implemented as a desktop computer, portable computer, laptop or notebook computer, tablet computer, pocket computer, telephone, smart phone, network switches or routers, or any other appropriate type of electronic device.

Figure 2:
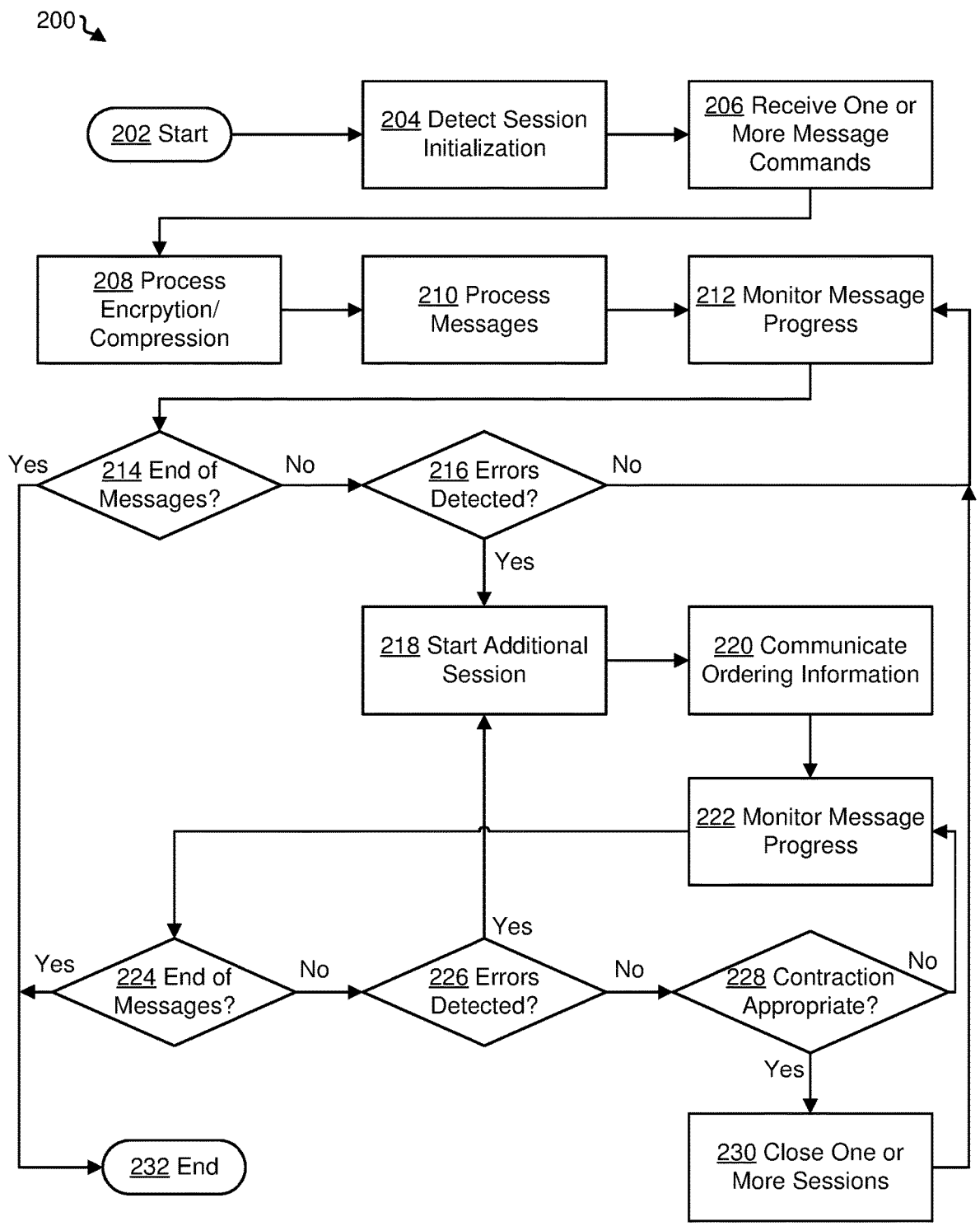
FIG. 2 depicts an example method for session management, in accordance with embodiments of the present disclosure.

Referring now to FIG. 2, depicted is an example method 200 for session management, in accordance with embodiments of the present disclosure. The following discussion will refer to method 200 being performed by a communications layer. It is to be understood that the communications layer can be implemented by (and, hence, method 200 can be performed by) a computer, a processor, a memory controller, firmware or software running on a computer system, or other component(s) of a computer system. Method 200 can include more or fewer operations than those depicted. Method 200 can include operations in different orders than those depicted, including one or more operations occurring simultaneously.

Method 200 can be performed by a communications layer operating on the source computer node which will send information to a target computer node which will receive information. Method 200 can also be performed by a communications layer operating on the target computer node. In some embodiments, method 200 will be performed simultaneously or substantially at the same time on both a source node and a target node. In some embodiments, the communications layer can use technology including Aspera's FASP® (Fast and Secure Protocol) and can be implemented using an API, such as provided by Aspera.

Method 200 starts at 202. At 204, the communications layer detects session initialization. An application using the communications layer can send or receive an initialization command, which can contain information for the communications layer regarding the beginning of transmission. This information can include various types or amounts of information in embodiments, including the number of messages, the size of messages, the number of sessions, the source or target node, etc. The communications layer can use the initialization command and/or information contained within to open one or more sessions.

At 206, the communications layer receives one or more message commands. These commands can include send commands and receive commands and may depend on whether the communications layer is operating on the source node or the target node.

At 208, the communications layer processes encryption and/or compression. This can occur in a communications layer of a sending computer by encrypting and/or compressing messages before transmission or during the transmission process. This can also occur in a communications layer of a receiving computer by decrypting and/or decompressing messages upon receipt of messages or afterwards. The communications layer can utilize various encryption techniques known in the art, but do so at the level of the communications layer. Additionally, this can prevent programmers or other developers who will be using the communications layer in their applications from needing to provide for encryption processes specific to one or more programs and instead use the encryption provided for in the communications layer. In some embodiments, through the use of an API, such as Aspera's API, one or more aspects of the encryption process, including strength of encryption and/or encryption techniques can be modified or selected for use by the communications layer. Additionally, the communications layer can use various compression and decompression techniques. Compression can further improve network traffic through the communication sessions by shrinking file sizes before sending, which enables the same data to proceed faster and/or for more data to flow at the same time. In some embodiments, a program utilizing the communications layer can provide for or specify a specific type of compression, which the communications layer can use when sending the messages. In some embodiments, a communications layer on a target node can decompress messages upon receipt, while in other embodiments, a communications layer can decompress messages on an as-needed basis. In some embodiments, compression can be selectively used when the messages are capable of a sufficient level of compression (i.e., their size can be sufficiently reduced such that the compression and decompression will result in sufficient benefits).

At 210, the communications layer processes the messages. A communications layer can process messages by sending or receiving them, queueing them for sending or receipt, separating large messages into subparts for sending, or any other processing. Operation 210 can occur simultaneously or otherwise in conjunction with operation 208.

At 212, the communications layer monitors the progress of the messages. This monitoring can include monitoring for the end of messages, which can include monitoring for a close or end command (or other such explicit signal indicating the end of messages) or can include monitoring for a cessation of messages without resumption. A communications layer can have specified time limits for when a cessation of messages is to be interpreted as the end of messages. The monitoring can include monitoring for whether any error messages, such as "eagain" or "ewouldblock" errors, are detected. These error messages can indicate that the messages are unable to be sent at the rate the communications layer is sending the messages over the session(s) and that one or more additional sessions could improve performance. The communications layer can also monitor for signs of errors or reduced performance in other fashions, including messages being queued or delayed to an unacceptable level. In some embodiments, the communications layer can monitor whether the messages are progressing at an expected throughput value (for example such a value provided for in a service level agreement) and/or detect a throughput value which the messages are progressing at.

At 214, the communications layer determines whether the end of messages has occurred. If so, method 200 proceeds to end at 232. If the end of messages has not been reached, method 200 proceeds to 216.

At 216, the communications layer determines whether errors, such as "eagain" or "ewouldblock" errors, have been detected or received. In some embodiments, this can include comparing a number of such errors with an acceptable threshold value. For example, a threshold value of 20 could indicate that the communications layer will proceed to open an additional session once 20 "eagain" or "ewouldblock" errors are received, but if fewer than 20 such errors are received the communications layer will continue to use the existing number of sessions. In some embodiments, the communications layer may send the message(s) which resulted in error(s) one or more additional times and detect if the error(s) persist before making a determination that errors have been received or before counting such error(s) and comparing to the threshold value. In some embodiments, the communications layer can determine errors have been received if the messages are providing at a throughput value which is too low, or below an expected value. If errors are not detected, or if the number of errors detected is lower than the threshold value, method 200 can loop back to operation 212 to continue monitoring message progress. If errors are detected, or if the number of errors detected is equal to or greater than the threshold value, method 200 proceeds to 218.

At 218, the communications layer starts one or more additional communication sessions. The communications layer can begin sending or receiving messages through the new session(s). The communications layer may begin this sending or receiving with any messages which resulted in the error(s) detected at operation 216. The new session(s) can increase the available bandwidth which the communications layer can send or receive messages.

At 220, the communications layer communicates ordering information such that messages can be received over the multiple sessions in appropriate orders. In some embodiments, the session initialization at operation 204 may indicate that more than one session should be opened earlier in method 200. In such embodiments, operation 220 may occur earlier than depicted. In some embodiments, the one or more message commands received at operation 206 may include within them, or be accompanied by, ordering information. The ordering information will vary in embodiments and can include implicit ordering or explicit ordering.

In embodiments using implicit ordering, the communications layer can send or receive messages in a deterministic or predetermined manner. One such example is round robin scheduling, where messages are sent/received over each session in turn until each session has sent/received a message and the first session sends/receives the next message. In embodiments using implicit ordering, a sending communications layer can communicate the format of the implicit ordering once (or periodically) to a receiving communications layer without need for including ordering information with each message. An example of implicit ordering is depicted in FIG. 3 and discussed infra.

In embodiments using explicit ordering, the communications layer can include with some or all of the messages, ordering information relating to the message it accompanies. This ordering information can be in the form of ordering primitives. A primitive could be "send(ID, message))" which instructs the communications layer to send the message with the specified ID number. In an example of ordering information, if a communications layer is sending 5 messages which a receiving program should process in order, they can be accompanied by message identifiers such as ordinal numbers like "first," "second," etc. up to "fifth," such that a receiving communications layer can properly order the messages upon receipt, regardless of whether e.g., the first message is received first. Many variations on numbering or otherwise identifying messages with an identifier which corresponds to its place in order exist and can be used with this disclosure. In some embodiments, not all messages will require ordering information. For example, some messages may be stand-alone messages, such that a receiving program can process them independently of any other received messages. These messages may not need to be accompanied by message identifiers. A communications layer on a target node can perform dependency analysis on received messages to determine which messages belong to ordered groups and which messages are stand-alone messages.

In contrast to embodiments using implicit ordering, a communications layer utilizing explicit ordering can send or receive messages through sessions based on factors other than ordering. A communications layer can send or receive messages in a session based upon the available bandwidth of a session and/or based on historical bandwidth information for a session. In some embodiments, a communications layer group together messages to send or receive in a session and may queue messages to send until a group of a sufficient size is formed. In some embodiments, messages can be grouped on parameters based upon the application which is using the communications layer or other factors. In embodiments using explicit ordering, if an error such as "eagain" or "ewouldblock" is received or detected, the communications layer can send or receive the messages through another session without concern for ordering, such as may be present if a message is sent through a different session in an implicit ordering embodiment. In embodiments using explicit ordering, a communications layer on a source node and a communications layer on a target node can have different numbers of sessions open, but due to the ordering information included where appropriate, the communications layers can still effectively communicate the messages.

At 222, the communications layer can continue to monitor message progress. Operation 222 can proceed similarly to operation 212, but the communications layer can monitor as many sessions as are active, including the session(s) added during operation 218. When monitoring message progress with more than one session, the communications layer can additionally monitor which session(s) are less loaded compared to other sessions and direct message traffic to sessions as appropriate. To aid in such monitoring, the communications layer can identify a network capacity by monitoring which messages result in errors. For example, if the communications layer detects errors in a session when sending messages of a size 64 kilobytes or larger, the communications layer can determine the network capacity is such that that sessions cannot handle more than 64 kilobytes. If a communications layer determines such a network capacity, it can ensure when adding messages to sessions that the sizes of the messages are not more than the network capacity. A communications layer can also group messages together which total an amount lower than the network capacity to transfer together to provide for high throughput.

At 224, the communications layer determines whether the end of messages has occurred. If so, method 200 proceeds to end at 232. If the end of messages has not been reached, method 200 proceeds to 226. Operation 224 can proceed in a similar fashion to operation 214.

At 226, the communications layer determines whether errors, such as "eagain" or "ewouldblock" errors, have been received. In some embodiments, this can include comparing a number of such errors with an acceptable threshold value. In some embodiments, the communications layer may send the message(s) which resulted in error(s) one or more additional times and detect if the error(s) persist before making a determination that errors have been received or before counting such error(s) and comparing to the threshold value. In some embodiments, the communications layer can determine errors have been received if the messages are providing at a throughput value which is too low, or below an expected value. If errors are detected, or if the number of errors detected is equal to or greater than the threshold value, method 200 proceeds back to operation 218 to start another additional session or sessions. If errors are not detected, or if the number of errors detected is lower than the threshold value, method 200 proceeds to operation 228. Operation 226 can proceed in a similar fashion to operation 216.

At 228, the communications layer can determine whether to contract the number of sessions. In some embodiments, the communications layer may determine whether to contract the number of sessions based on the time since the last error message was received, the time since the last session was opened, the amount of error messages received is below a threshold value, or any other indication that one or more sessions are no longer necessary. In embodiments which use acceptable threshold value(s) of errors in error detection operations 216 and 226, the same threshold or a lower threshold value can be used in determination of whether to contract the number of sessions. If the same threshold value is used, fluctuations could result where sessions are opened and closed in short order when the number of errors goes above or below the threshold value. If a lower threshold value is used, one or more sessions may remain open when they are not necessary, but the communications layer will operate with more stability. Continuing with the example above of a threshold value of 20 errors to open a new session, if the threshold value for contraction is 5 errors, the additional session(s) will be opened once 20 or more errors are detected and the number of sessions will continue to be the same without contraction (or increase again if at operation 226, 20 or more errors were detected again) until less than 5 errors are detected. In some embodiments, instead of, or in addition to, threshold values of errors, the communications layer can skip operation 228 until a certain time has passed since the most recent session was opened to prevent sessions from opening and closing too rapidly, which could result in thrashing. In some embodiments, the threshold value may vary with time or the number of errors can be weighted relative to the time since the last session was opened in a fashion such that the longer the most recent session opened has been open, the more likely it will be that the communications layer determines contraction is appropriate. In some embodiments, the determination of whether contraction is appropriate can be based upon the throughput value the messages are progressing at and any expected throughput value. For example, if messages are progressing above an expected throughput value, the communications layer may determine that contraction may occur without lowering the throughput below the expected value.

If the communications layer determines contraction is not appropriate, method 200 can loop back to operation 222 to continue monitoring message progress. If the communications layer determines contraction is appropriate, method 200 proceeds to 230.

At 230, the communications layer closes one or more of the open sessions. The communications layer can close the session(s) in reverse order, such that the newest session is closed first. In some embodiments, the communications layer can close the session(s) on the basis of current message traffic being transmitted over the sessions, with the session(s) with the lowest traffic being closed first. After closing one or more sessions, method 200 can return to operation 222 to continue monitoring message progress.

Method 200 ends at 232 when the end of messages is detected at either 214 or 224.

Figure 3A:
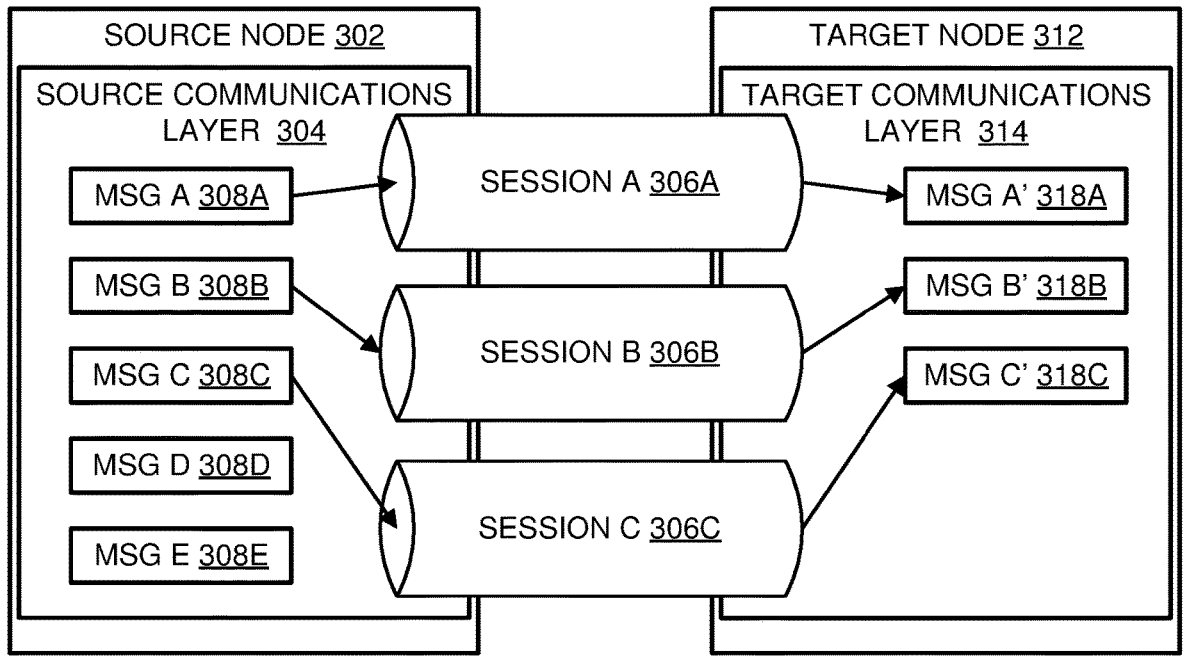
FIGS. 3A-3B depict a block diagram showing transmission of messages using implicit ordering, in accordance with embodiments of the present disclosure.

Referring now to FIG. 3A, depicted is a block diagram 300 showing transmission of messages using implicit ordering, in accordance with embodiments of the present disclosure. A source node 302 contains a source communications layer 304. The source communications layer 304 contains five messages, MSG A (308A) through MSG E (308E), to send to a target node 312. The target node 312 contains a target communications layer 314. Depicted in FIG. 3A, the source communications layer has sent MSG A (308A) through a session labeled session A (306A), MSG B (308B) through a session labeled session B (306B), and MSG C (308C) through a session labeled session C (306C). The target communications layer 314 has received these messages as depicted by MSG A' (318A) through MSG C' (318C). The target communications layer 314 has ordered these three messages as shown due to their receipt along each of the sessions in turn.

Figure 3B:
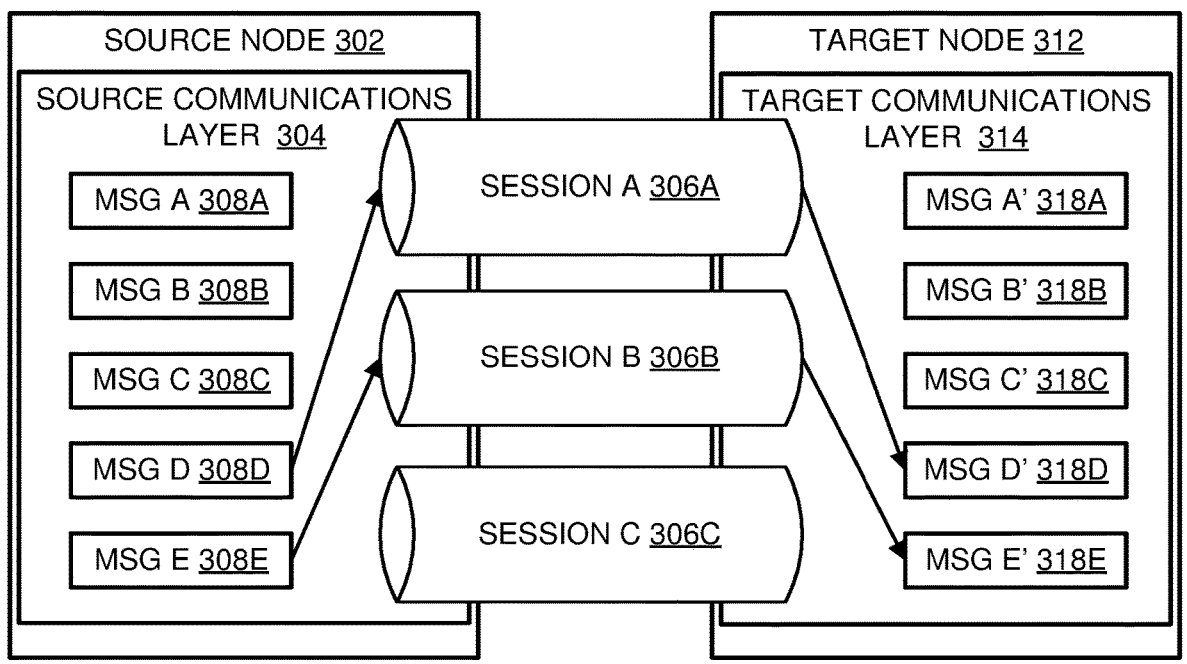

Referring now to FIG. 3B, depicted is a block diagram 350 showing transmission of messages using implicit ordering, in accordance with embodiments of the present disclosure. FIG. 3B shows the same components as those in FIG. 3A, but after the source communications layer 304 has additionally sent MSG D (308D) through session A (306A) and MSG E (308E) through session B (306B). The target communications layer 314 has received these messages as depicted by MSG D' (318D) and MSG E' (318E). The target communications layer 314 has continued to order the received messages as shown due to their receipt along each of the sessions in turn, beginning again with the first session after the communications layers used all available sessions once in FIG. 3A.

Figure 4:
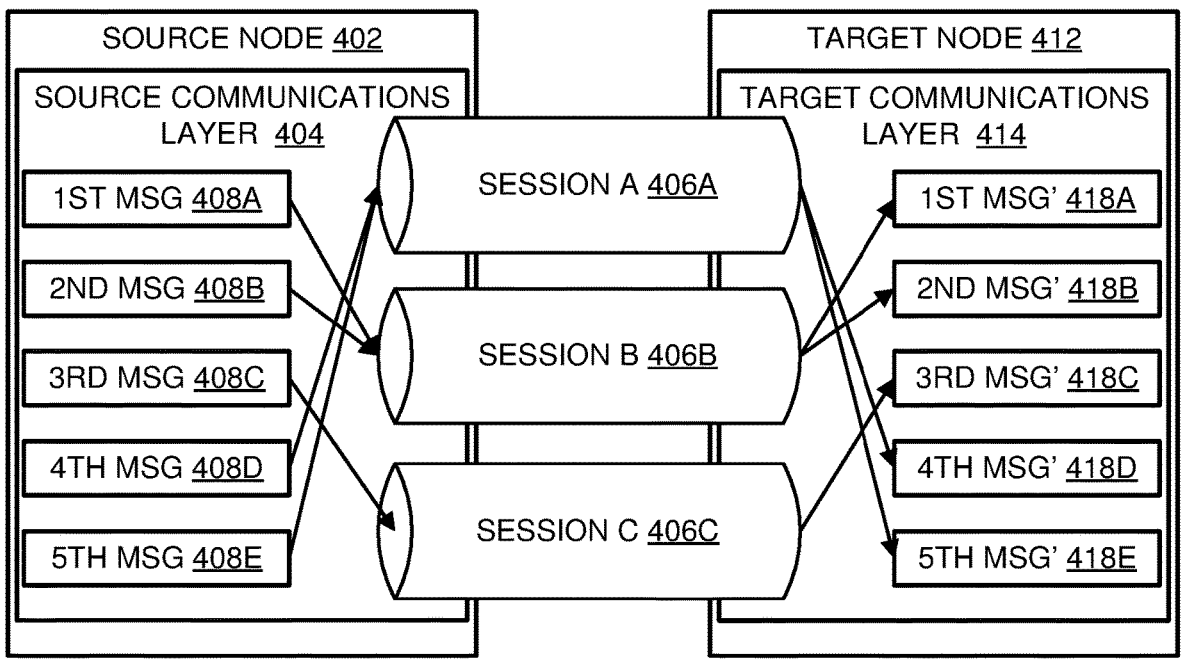
FIG. 4 depicts a block diagram showing transmission of messages using explicit ordering, in accordance with embodiments of the present disclosure.

Referring now to FIG. 4, depicted is a block diagram 400 showing transmission of messages using explicit ordering, in accordance with embodiments of the present disclosure. A source node 402 contains a source communications layer 404. The source communications layer 404 contains five messages, 1ST MSG (408A) through 5TH MSG (408E), to send to a target node 412. The target node 412 contains a target communications layer 414. Depicted in FIG. 4, the source communications layer has sent 1ST MSG (408A) through a session labeled session B (406B), 2ND MSG (408B) also through session B (406B), 3RD MSG (408C) through a session labeled session C (406C), 4TH MSG (408D) through a session labeled session A (406A), and 5TH MSG (408E) also through session A (406A). The target communications layer 414 has received these messages as depicted by 1ST MSG' (418A) through 5TH MSG' (418E). Regardless of whether the messages were sent simultaneously or in any chronological order and regardless of the sessions used by source communications layer 404 and target communications layer 414, the target communications layer 414 has ordered these five messages as shown due to the ordinal numbers 1ST through 5TH.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for communications management, the method comprising:
  detecting, by a communications layer that is implemented using an application programming interface (API), initialization of a first messaging session between a source computer node and a target computer node;

receiving, by the communications layer, from an application running on the source computer node, one or more message commands to transmit one or more messages to the target computer node;

transmitting, by the communications layer, the one or more messages to the target computer node without first writing the one or more messages to a local disk;

monitoring, by the communications layer, message progress of the first messaging session;

detecting, by the communications layer, errors in the message progress that indicate that the one or more messages are unable to be processed by the target computer node at a rate that the communications layer is sending them;

starting, by the communications layer, in response to detecting the errors in the message progress, one or more additional messaging session(s);

transmitting, after starting the one or more additional messaging session(s), the one or more messages to the target node using the first messaging session and the one or more additional messaging session(s), wherein transmitting the one or more messages using the first messaging session and the one or more additional messaging session(s) comprises:

sending, by the communications layer, an implicit ordering format to the target computer node, the implicit ordering format defining an order of messaging sessions in which the one or more messages will be transmitted; and transmitting the one or more messages using the first messaging session and the one or more additional messaging session(s) according to the implicit ordering format;

monitoring, by the communications layer, message progress of the first messaging session and the one or more additional messaging session(s);

detecting, by the communications layer, contraction of messaging sessions is appropriate; and closing, by the communications layer, one or more messaging sessions.

2. The method of claim 1, the method further comprising:
encrypting, by the communications layer, the one or more messages, wherein the communications layer is configured to encrypt the one or more messages automatically without the application being configured to encrypt data.

3. The method of claim 1, the method further comprising:
compressing, by the communications layer, the one or more messages.

4. The method of claim 1, the method further comprising:
sending, by the communications layer, the one or more messages using the first messaging session and the one or more additional messaging session(s).

5. The method of claim 1, wherein the one or more additional messaging session(s) comprise a second messaging session and a third messaging session, and wherein the implicit ordering format is a round robin format, the method further comprising:

transmitting a first message of the one or more messages to the target computer node using the first messaging session;

transmitting a second message of the one or more messages to the target computer node using the second messaging session, the second message following the first message in message order;

transmitting a third message of the one or more messages to the target computer node using the third messaging session, the third message following the second message in message order; and transmitting a fourth message of the one or more messages to the target computer node using the first messaging session, the fourth message following the third message in message order.

6. The method of claim 4, wherein transmitting the one or more messages using the first messaging session and the one or more additional messaging session(s) comprises:

adding, to at least a portion of the one or more messages, ordering information that defines a position of the respective message relative to other messages of the one or more messages;

transmitting the one or more messages with the ordering information;

receiving an error indicating that a first message of the one or more messages sent using the first messaging session was not received; and transmitting the first message with the associated ordering information to the target computer node using a different messaging session.

7. The method of claim 1, wherein transmitting the one or more messages to the target node using the first messaging session and the one or more additional messaging session(s) comprises:

grouping a set of messages based on the application sending the set of messages;

queuing the set of messages until the set of messages reaches a threshold size;

determining an available bandwidth of each of the first messaging session and the one or more additional messaging session(s);

determining a particular messaging session to use based on the available bandwidths; and sending the set of messages using the particular messaging session.

8. The method of claim 1, the method further comprising:
determining, for each messaging session, a maximum message size, wherein transmitting the one or more messages to the target node using the first messaging session and the one or more additional messaging session(s) comprises ensuring that each message added to a respective messaging session does not exceed the maximum message size for the respective messaging session.

9. The method of claim 1, wherein detecting, by the communications layer, that contraction of messaging sessions is appropriate comprises:

determining a first amount of time since a last error message was received;

determining a second amount of time since a particular messaging session was started, the particular messaging session being the most recently started messaging session; and determining that the first amount of time exceeds a first threshold and that the second amount of time exceeds a second threshold.

10. The method of claim 1, wherein the detecting errors in the message progress comprises:

comparing, by the communications layer, a number of detected errors in the message progress with a threshold number of acceptable errors; and determining, by the communications layer, the number of detected errors exceeds the threshold number of acceptable errors, wherein the starting of the one or more additional messaging session(s) occurs in response to the determination that the number of detected errors exceeds the threshold number of acceptable errors.

11. The method of claim 1, wherein the detecting that contraction of messaging sessions is appropriate further comprises:
comparing, by the communications layer, a number of detected errors in the message progress with a threshold number of acceptable errors; and
determining, by the communications layer, the number of detected errors does not exceed the threshold number of acceptable errors.

12. A system for communications management, the system comprising:
one or more processors; and
a memory communicatively coupled to the one or more processors, wherein the memory comprises an application, and
wherein the memory further comprises instructions which, when executed by the one or more processors, cause the one or more processors to perform a method comprising:
detecting, by a communications layer that is implemented using an application programming interface (API), initialization of a first messaging session between the system and a target computer node;
receiving, by the communications layer, from the application running on the system, one or more message commands to transmit one or more messages to the target computer node;
transmitting, by the communications layer, the one or more messages to the target computer node without first writing the one or more messages to a local disk;
monitoring, by the communications layer, message progress of the first messaging session;
detecting, by the communications layer, errors in the message progress that indicate that the one or more messages are unable to be processed at a rate that the communications layer is sending them;
starting, by the communications layer, in response to detecting the errors in the message progress, one or more additional messaging session(s);
transmitting, after starting the one or more additional messaging session(s), the one or more messages to the target node using the first messaging session and the one or more additional messaging session(s), wherein transmitting the one or more messages using the first messaging session and the one or more additional messaging session(s) comprises:
sending, by the communications layer, an implicit ordering format to the target computer node, the implicit ordering format defining an order of messaging sessions in which the one or more messages will be transmitted; and
transmitting the one or more messages using the first messaging session and the one or more additional messaging session(s) according to the implicit ordering format;
monitoring, by the communications layer, message progress of the first messaging session and the one or more additional messaging session(s);
detecting, by the communications layer, contraction of messaging sessions is appropriate; and
closing, by the communications layer, one or more messaging sessions.

13. The system of claim 12, the method further comprising:
sending, by the communications layer, the one or more messages using the first messaging session and the one or more additional messaging session(s).

14. The system of claim 12, wherein the detecting that contraction of messaging sessions is appropriate further comprises:
comparing, by the communications layer, a number of detected errors in the message progress with a threshold number of acceptable errors; and
determining, by the communications layer, the number of detected errors does not exceed the threshold number of acceptable errors.

15. The system of claim 12, wherein the detecting errors in the message progress comprises:
comparing, by the communications layer, a number of detected errors in the message progress with a threshold number of acceptable errors; and
determining, by the communications layer, the number of detected errors exceeds the threshold number of acceptable errors,
wherein the starting of the one or more additional messaging session(s) occurs in response to the determination that the number of detected errors exceeds the threshold number of acceptable errors.

16. A computer program product for communications management, the computer program product comprising a computer readable storage medium having program instructions embodied therewith, wherein the computer readable storage medium is not a transitory signal per se, the program instructions executable by a computer to perform a method comprising:
detecting, by a communications layer that is implemented using an application programming interface (API), initialization of a first messaging session between a source computer node and a target computer node;
receiving, by the communications layer, from an application running on the source computer node, one or more message commands to transmit one or more messages to the target computer node;
transmitting, by the communications layer, the one or more messages to the target computer node without first writing the one or more messages to a local disk;
monitoring, by the communications layer, message progress of the first messaging session;
detecting, by the communications layer, errors in the message progress that indicate that the one or more messages are unable to be processed at a rate that the communications layer is sending them;
starting, by the communications layer, in response to detecting the errors in the message progress, one or more additional messaging session(s);
transmitting, after starting the one or more additional messaging session(s), the one or more messages to the target node using the first messaging session and the one or more additional messaging session(s), wherein transmitting the one or more messages using the first messaging session and the one or more additional messaging session(s) comprises:
sending, by the communications layer, an implicit ordering format to the target computer node, the implicit ordering format defining an order of messaging sessions in which the one or more messages will be transmitted; and transmitting the one or more messages using the first messaging session and the one or more additional messaging session(s) according to the implicit ordering format;

monitoring, by the communications layer, message progress of the first messaging session and the one or more additional messaging session(s);

detecting, by the communications layer, contraction of messaging sessions is appropriate; and closing, by the communications layer, one or more messaging sessions.

17. The computer program product of claim 16, wherein the detecting that contraction of messaging sessions is appropriate further comprises:

comparing, by the communications layer, a number of detected errors in the message progress with a threshold number of acceptable errors; and determining, by the communications layer, the number of detected errors does not exceed the threshold number of acceptable errors.

18. The computer program product of claim 16, the method further comprising:

sending, by the communications layer, the one or more messages using the first messaging session and the one or more additional messaging session(s).

19. The computer program product of claim 16, wherein the detecting errors in the message progress comprises:

comparing, by the communications layer, a number of detected errors in the message progress with a threshold number of acceptable errors; and determining, by the communications layer, the number of detected errors exceeds the threshold number of acceptable errors, wherein the starting of the one or more additional messaging session(s) occurs in response to the determination that the number of detected errors exceeds the threshold number of acceptable errors.

* * * * *